(12) United States Patent
Shepherd

(10) Patent No.: US 10,814,268 B2
(45) Date of Patent: Oct. 27, 2020

(54) PROCESS FOR SEPARATING GASES FROM GAS MIXTURES USING HYDRO FLUORO ETHER

(71) Applicant: Samuel L. Shepherd, Cypress, TX (US)

(72) Inventor: Samuel L. Shepherd, Cypress, TX (US)

( * ) Notice: Subject to any disclaimer, the term of this patent is extended or adjusted under 35 U.S.C. 154(b) by 427 days.

(21) Appl. No.: 15/939,701

(22) Filed: Mar. 29, 2018

(65) Prior Publication Data

US 2019/0299156 A1   Oct. 3, 2019

(51) Int. Cl.
  *B01D 53/14* (2006.01)
  *C01B 13/02* (2006.01)

(52) U.S. Cl.
  CPC ..... *B01D 53/1425* (2013.01); *B01D 53/1418* (2013.01); *B01D 53/1493* (2013.01); *C01B 13/0285* (2013.01); *B01D 2252/205* (2013.01); *C01B 2210/0046* (2013.01)

(58) Field of Classification Search
  CPC .......... B01D 2252/205; B01D 2256/12; B01D 2257/102; B01D 53/14; B01D 53/1418; B01D 53/1425; B01D 53/1493; B01D 53/18; C01B 13/0248; C01B 13/0285; C01B 2210/0046
  See application file for complete search history.

(56) References Cited

U.S. PATENT DOCUMENTS

| | | |
|---|---|---|
| 4,542,010 A | 9/1985 | Roman et al. |
| 4,701,187 A | 10/1987 | Choe et al. |
| 4,824,453 A | 4/1989 | Rottmann et al. |
| 5,207,806 A | 5/1993 | Lagree et al. |
| 5,231,837 A | 8/1993 | Ha |
| 5,429,666 A | 7/1995 | Agrawal et al. |
| 5,567,765 A | 10/1996 | Moore et al. |
| 5,785,950 A | 7/1998 | Kaufman et al. |
| 6,221,261 B1 * | 4/2001 | Boss .................. C02F 1/06 210/749 |
| 6,350,298 B1 | 2/2002 | Su et al. |

* cited by examiner

*Primary Examiner* — Cabrena Holecek
(74) *Attorney, Agent, or Firm* — Egbert, McDaniel & Swartz, PLLC

(57) ABSTRACT

A process for something separating oxygen from air includes mixing the air with hydro fluoro ether in a closed vessel for a desired period of time so that the oxygen from the air is adsorbed into the hydro fluoro ether, discharging the oxygen-adsorbed hydro fluoro ether from the closed vessel, and flashing the oxygen-adsorbed hydro fluoro ether into a chamber so that so as to separate the oxygen from the hydro fluoro ether. Nitrogen is separated from the air as the oxygen is adsorbed in the hydro fluoro ether in the closed vessel. The step of flashing that includes passing the elevated pressure oxygen-adsorbed hydro fluoro ether across a restricting orifice so as to evaporate the oxygen from the hydro fluoro ether.

10 Claims, 2 Drawing Sheets

PROCESS FOR SEPARATING GASES FROM GAS MIXTURES USING HYDRO FLUORO ETHER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to separating gas from air. More particularly, the present invention relates to separating nitrogen and oxygen from air. Furthermore, the present invention relates to processes for separating gases from gas mixtures using hydro fluoro ether.

2. Description of Related Art Including Information Disclosed Under 37 CFR 1.97 and 37 CFR 1.98

Oxygen and nitrogen are among the most widely used chemicals in the world, the annual consumption of each gas amounting in excess of 20,000,000 tons in the United States. Most of this oxygen is used in the steel industry and related metals manufacturing processes. Oxygen-enriched air has also found significant uses, including treatment of wastewater, non-ferrous smelting, glass production, medical applications, and other chemical oxidation processes. In addition, there a great potential market for oxygen-enriched air in the synthetic fuels industry. Nitrogen and nitrogen-enriched air are useful in a variety of industries.

Most of all oxygen and nitrogen is currently produced by cryogenic fractionation. This process involves lowering the temperature of air sufficiently to liquefy it and then using a multistage distillation process to produce pure oxygen and pure nitrogen. A major drawback of such cryogenic processes is that they require great deal of energy and consequently are very expensive.

An alternative method that has been investigated for producing oxygen-enriched air involves selective permeation through polymeric membranes. Membranes are attractive for gas separation because of their low energy requirements and inherent selectivity.

Pressure swing adsorption is a widely used technology for the purification of gases. This regeneration process is accomplished by reducing the pressure. Moderate pressures found in compressed air systems, such as 100 pounds per square inch, and an adsorbent can support a certain amount of moisture. When that pressure is dropped to ambient air pressure, the adsorbent can only support a smaller amount of moisture. By swinging the pressure from high to low, it is possible to adsorb large quantities of moisture at the higher pressure, and then release that moisture at the low-pressure. This technique is called pressure swing adsorption. By alternating between two adsorbent-filled vessels, one vessel being online and removing moisture at high-pressure, and the other off-line and releasing the trapped moisture at low-pressure, it is possible to thoroughly dry a gas. Conventional pressure swing adsorption systems in use today in industry are made up of four to sixteen large vessels, connected by a complex network of piping and valves to switch the gas flows between the vessels. Despite their widespread use in industry, conventional pressure swing adsorption systems suffer from a number of inherent disadvantages. These pressure swing adsorption systems typically operate at slow cycle speeds of 0.05 to 0.5 cycles per minute since faster cycle speeds could cause the adsorbent beads to float or fluidize in the vessel, causing the beads to wear and ultimately fail. To meet customer demands for capacity, conventional pressure swing adsorption systems must utilize large vessels to compensate for the slow cycle speeds, leading to higher costs and a large equipment footprint. The use of large vessels also means that these pressure swing adsorption systems are typically erected in the field, thereby increasing installation costs. The network of piping and valves used in large-scale pressure swing adsorption systems, with the associated instrumentation and process control equipment, also adds cost to the overall system.

In the past, various patents have issued relating to oxygen and nitrogen separation processes. For example, U.S. Pat. No. 4,542,010, issued on Sep. 17, 1985 to Roman et al., describes a method and apparatus for producing oxygen and nitrogen, along with a membrane therefor. The processes utilizes facilitated transport membranes to selectively transport oxygen from one gaseous stream to another so as to leave nitrogen as a byproduct. In this method, an oxygen carrier capable of reversibly binding molecular oxygen is dissolved in a polar organic membrane which separates a gaseous feed stream, such as atmospheric air, and a gaseous product stream. The feed stream is maintained at a sufficiently high oxygen pressure to keep the oxygen carrier in its oxygenated form at the interface of the feed stream with a membrane, while the product stream is maintained at a sufficiently low oxygen pressure to keep the carrier in its deoxygenated form at the interface of the product stream with the membrane.

U.S. Pat. No. 4,701,187, issued Oct. 20, 1987 to Choe et al., describes a process for separating components of a gas stream. A feed gas mixture is initially separated in a membrane separation unit to produce a gas stream concentrated in the desired component. The concentrated gas stream is subsequently further separated in an adsorption unit having an adsorbent that would selectively adsorb non-desirable gaseous components so as to produce a purified product stream. The non-desired gaseous components are subsequently desorbed and a purge stream from the adsorption unit containing the desorbed non-desirous gaseous components, along with a portion of the desired components, is recycled to the feed gas mixture.

U.S. Pat. No. 4,824,453, issued on Apr. 25, 1989 to Rottman et al., teaches a process and apparatus for air separation by rectification. Rectification air is preliminarily separated in a first rectification stage of a two-stage rectification column to obtain a nitrogen-rich fraction and an oxygen-rich fraction. These two fractions are fed to the second rectification stage and separated into oxygen and nitrogen fractions. An argon-enriched fraction, containing essentially oxygen and argon, is removed from the second rectification stage at an intermediate point and is separated in a raw argon column by rectification into an argon-rich fraction and a liquid fraction containing essentially oxygen. The liquid fraction is fed back into the second rectification stage.

U.S. Pat. No. 5,207,8065, issued on May 4, 1993 to LaGree et al., provides a dual product pressure swing adsorption and membrane operation. The waste gas of a pressure swing adsorption-air separation operation is passed to a membrane system for enhanced recovery of a second product. By capturing the portion found to contain a high concentration of either a nitrogen or oxygen in the waste stream, the efficiency of the overall separation is enhanced.

U.S. Pat. No. 5,231,837, issued on Aug. 3, 1993 to B. Having a, provides a cryogenic distillation process for the production of oxygen and nitrogen. This process includes providing a feed stream of clean, dry and compressed air, cooling at least a fraction of the compressed air and introducing such fraction into a high-pressure column so as to separate the air into a nitrogen-rich stream at the top of the column and an oxygen-rich stream at the bottom of the column, introducing at least a fraction of the oxygen-rich stream into an intermediate column to afford a top liquid fraction and a bottom liquid fraction, introducing at least a fraction of the liquid fractions into the low-pressure column as feed, feeding at least a fraction of the nitrogen-rich stream to the low-pressure column as reflux, and recovering an oxygen-rich stream product at the bottom of the low-pressure column and a low-pressure nitrogen-rich stream at the top of the low-pressure column.

U.S. Pat. No. 5,429,666, issued on Jul. 4, 1995 to Agrawal, teaches a process for separating a feed gas mixture into a more strongly adsorbed double component and a less strongly adsorbed double component and a plurality of adsorbent beds containing at an adsorbent selected for the more strongly adsorbed double component. Pressure is applied from product end to product end so as to achieve pressure equalization between beds simultaneously with concurrent ambient and elevated pressure feed pressurization. Products and purge gases are co-produced. Concurrent depressurization for pressure equalization gas is simultaneous with countercurrent evacuation. The oxygen product is recovered from air at high recovery rates using the process.

U.S. Pat. No. 9,231,644, issued on May 15, 2001 to Jain et al., shows a method of separating a first gaseous component from a gas mixture. The gaseous mixture is passed into an adsorption zone containing an adsorbent material capable of preferentially adsorbing at least one of the gaseous components in the gaseous mixture. The first gaseous component is separated from the second gaseous component so that the adsorbent material is a monolith having a plurality of channels therethrough. The channels are aligned parallel to the direction of flow of the gaseous mixture. The non-preferentially adsorbed gaseous component is recovered from the adsorption zone. The adsorption zone comprises multiple layers of monolithic structures in the shape of a wheel stacked one upon the other in a direction parallel to the direction of the flow of the gaseous mixture.

U.S. Pat. No. 6,350,298, issued on Feb. 2, 2002 to Suitable, provides a novel composition of a molecular sieve adsorbent. These molecular sieve adsorbents are particularly useful for the separation of gas and, more particularly, for the separation of nitrogen from air to produce oxygen or oxygen-enriched gas.

Also, in the past, there have been significant developments in the creation of artificial blood. In particular, this artificial blood utilizes hydro fluoro ether as described in U.S. Pat. No. 5,567,765, issued on Oct. 22, 1996 to Moore et al., and in U.S. Pat. No. 5,785,950, issued on Jul. 28, 1998 to Kaufman et al., each of these patents is owned by Minnesota Mining and Manufacturing company of St. Paul, Minn. Each of these patents describes highly fluorinated fluoro-substituted, non-cyclic organic compounds having seven to twelve carbon atoms. Importantly, this been found that this hydro fluoro ether can absorb in excess of 48% by weight of oxygen.

U.S. Pat. No. 6,221,261, issued on Apr. 24, 2001 to Boss et al., provides a process for treating sewage using hydro fluoro ether polymers. This process includes the steps of mixing the sewage with hydro fluoro ether polymers, retaining the sewage with the hydro fluoro ether polymers for a desired period of time so as to produce oxygenated sewage and carbon-dioxide hydrochloride ether polymers, and separating the carbon dioxide-containing hydro fluoro ether polymers from the oxygenated sewage. Water is separated from the oxygenated sewage so as to produce a sludge.

It is an object of the present invention to provide a process that separates gases from gas mixtures using hydro fluoro ether.

It is another object of the present invention to provide a process that can separate oxygen and nitrogen from air so as to produce an oxygen-rich component and a nitrogen-rich component.

It is another object of the present invention provide a separation process that operates at near-ambient temperatures.

It is another object of the present invention to provide a process that operates continuously.

It is another object of the present invention to provide a separation process that has low global warming potential.

It is another object of the present invention to provide a separating process that causes zero ozone depletion.

It is another object of the present invention provide a separation process that has no regulatory issues involved.

It is another object of the present invention to provide a separation process that has no volatile organic components.

It is another object of the present invention to provide a separation process that is non-flammable.

It is another object of the present invention provide a separation process that is non-conductive.

It is another object of the present invention to provide a separation process that has excellent materials compatibility.

It is another object of the present invention to provide a separation process that is non-corrosive.

It is another object of the present invention to provide a separation process that has low toxicity.

It is another object of the present invention to provide a separation process that is safe for workers.

It is another object of the present invention to provide a separation process that is a suitable alternative to hydrochlorofluorocarbons, hydro chlorofluorocarbons, and other common industrial solvents.

It is another object the present invention to provide a separation process that can be carried out in a closed system.

It is still another object of the present invention to provide a separation process that has a minimal footprint.

It is another object of the present invention provide a separation process that has minimal capital and operating costs.

It is still further object of the present invention to provide a separation process that provides a sellable end product.

These and other objects and advantages of the present invention will become apparent from a reading of the attached specification and appended claims.

BRIEF SUMMARY OF THE INVENTION

The present invention is a process for generating and recovering a gas from an air feedstock. This process includes the steps of: (1) mixing hydro fluoro of either with the air feedstock in a closed vessel; (2) retaining the air feedstock in contact with the hydro fluoro ether for a desired period of time so that the hydro fluoro ether adsorbs a first gas component of the air feedstock so that an un-adsorbed second gas component remains in the closed vessel; and (3) collecting the un-adsorbed second gas component from the closed vessel.

The first and second gas components have different solubilities in the hydro fluoro ether. The closed vessel is pressurized to an elevated pressure and the first gas component-adsorbed hydro fluoro ether is discharged into a chamber having a reduced pressure so that the first gas component is separated from the hydro fluoro ether. In particular, the step for pressurizing is carried out at a pressure of between 14.7 p.s.i.a. and 174.7 p.s.i.a. The first gas component is discharged from the chamber. The hydro fluoro ether that has been separated from the gas component is collected in the chamber and then returned to the closed vessel.

The steps of mixing and retaining are carried out simultaneously. The closed vessel can be a tower with a packed media therein. The air feedstock is circulated with the hydro fluoro ether throughout the packed media in the tower. The second gas component is discharged from an upper portion of the tower.

This method, the first gas component is oxygen-rich. The step of discharging includes discharging oxygen from the chamber in which the oxygen has a purity of greater than 20% by volume. The second gas component can be oxygen-rich and have a purity of greater than 80% nitrogen by volume.

The present invention is also a process for separating oxygen from air. This process includes the steps of: (1) mixing air with hydro fluoro ether in a closed vessel for a desired period of time so that the oxygen from the air is adsorbed into the hydro fluoro ether; (2) discharging the oxygen-adsorbed hydro fluoro ether from the closed vessel; and (3) flashing the oxygen-adsorbed hydro fluoro ether into a chamber so as to separate the oxygen from the hydro fluoro ether. In this method, the oxygen is considered to be oxygen-rich gas and the nitrogen and is considered to be a nitrogen-rich gas.

The nitrogen is separated from the air as the oxygen is adsorbed in the hydro fluoro ether. The nitrogen is discharged from the closed vessel. The oxygen and the hydro fluoro ether are discharged from the closed vessel at an elevated pressure. This elevated-pressure oxygen-adsorbed hydro fluoro ether is passed across a restricting orifice so as to evaporate the oxygen from the hydro fluoro ether. The evaporated oxygen can then be discharged from the chamber. The oxygen-adsorbed hydro fluoro ether is at a pressure of between 14.7 and 174.7 p.s.i.a. and a temperature between 32° and 140° F.

The hydro fluoro ether is collected in the chamber following the step of flashing. This collected hydro fluoro ether is returned to a hydro fluoro ether inlet of the closed vessel. The closed vessel is a tower having a packed media therein. The air and the hydro fluoro ether are circulated throughout the packed media in the tower.

In this method of the present invention, the step of mixing includes inputting the air adjacent a bottom of the closed vessel, flowing this air upwardly through the closed vessel, inputting the hydro fluoro ether adjacent the top of the closed vessel, and flowing the hydro fluoro ether downwardly in the closed vessel so that the air mixes with the hydro fluoro ether. The hydro fluoro ether can either be flowed concurrently with the air or counter currently with the air.

The present invention is used to separate some gas species from a mixture of gases under various pressures in accordance with the specific molecular characteristics and solubilities for hydro fluoro ether materials. The present invention operates at near-ambient temperatures and differ significantly from cryogenic distillation techniques of gas separation and pressure swing adsorption processes. The present invention utilizes specific hydro fluoro ether materials as a trap which preferentially adsorbs the target gas species based upon solubility differences in the gases. The process operates continuously. The adsorption processes utilized in the present invention rely upon the fact that under certain operating pressures, temperatures and gas concentrations, gases tend to be adsorbed into the liquid hydro fluoro ether based on the specific solubility of the individual gases in the mixture. When the pressure is reduced, the adsorbed gas is released or desorbed. This process can be used to separate gases in a mixture because different gases tend to be dissolved in the hydro fluoro ether more or less strongly. If a gas mixture, such as air, is passed under pressure through a vessel that contains hydro fluoro ether which attracts oxygen more strongly than nitrogen, part or all of the oxygen will stay in the hydro fluoro ether, and the gas exiting the vessel will be richer in nitrogen than the mixture entering. The adsorption tower vessel is designed such that the flows are countercurrent and that the hydro fluoro ether reaches the end of its capacity to adsorb oxygen at the discharge. The oxygen in the hydro fluoro ether can be regenerated by reducing the pressure, thus releasing the adsorbed oxygen from the hydro fluoro ether. The hydro fluoro ether is then ready for return to the adsorption tower and another cycle of adsorbing oxygen so as to return to the adsorption tower for another cycle of adsorbing oxygen from the air.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
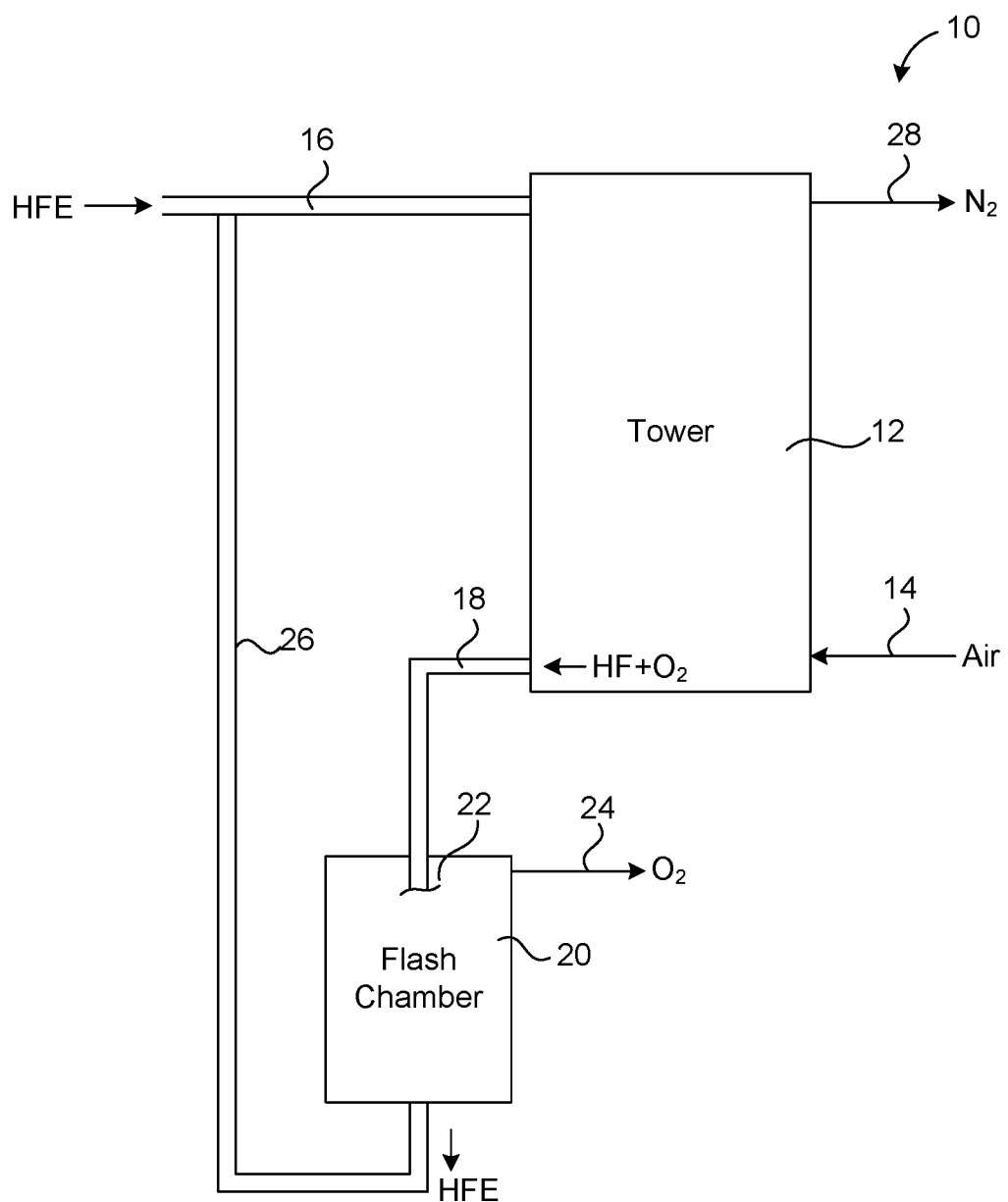
FIG. 1 is a block diagram showing the process for separating gases in accordance with the present invention.

Referring to FIG. 1, there shown the process 10 for the separating of gases from gas mixtures. For the purposes of illustration, the gas mixture is air. The gases that are separated include an oxygen-rich gas and a nitrogen-rich gas. The oxygen-rich gas is designated herein as "oxygen" and the nitrogen-rich gas herein is designated as "nitrogen".

In the process of the present invention, there is a closed vessel 12. Closed vessel 12 will be a tower having the configuration shown in FIG. 2 hereinafter. Initially air 14 is introduced in the closed vessel 12 adjacent to the bottom of the closed vessel 12. The air 14 will be caused to flow upwardly through the tower 12. As will be described hereinafter, the tower 12 has packed media therein so as to maximize the surface area within the interior of the tower 12. Hydro fluoro ether is introduced through line 16 into the top of the vessel 12. As such, the liquid hydro fluoro ether will flow downwardly within the closed vessel 12. The air 14 is mixed with the hydro fluoro ether for a desired period of time so that oxygen from the air is adsorbed into the hydro fluoro ether. The oxygen-adsorbed hydro fluoro ether is discharged from the closed vessel 12 through line 18. This oxygen-adsorbed hydro fluoro ether then flows through line 14 so as to be discharged into a flash chamber 20. There is a restricting orifice 22 at the end of line 18 so as to cause the oxygen-adsorbed hydro fluoro ether to be flashed within the flash chamber 20. This flashing will evaporate oxygen from the hydro fluoro ether. It can be seen that the oxygen is discharged outwardly of the flash chamber 20 along line 24. The flash chamber 20 will be operated a lower pressure than the pressure of the closed vessel 12. In particular, the closed vessel 12 will have a pressure of between 14.7 p.s.i.a. and 174.7 p.s.i.a. and will operate a temperature between 32° and 140° F. Since the flash chamber 20 operates at a lower pressure and/or higher temperature than the closed vessel 12, the oxygen will separate from the hydro fluoro ether.

In the present process 10 of the present invention, some of the oxygen-containing capacity hydro fluoro ether will deteriorate over time. Other quantities of hydro fluoro ether will be lost during the processing. As such, a hydro fluoro ether supply line 26 can be connected to the flash chamber 20 so as to replenish any lost hydro fluoro ether back to the inlet 16. This de-oxygenated hydro fluoro ether is passed from the flash chamber 20 back along the lines 26 and 16 so as to be introduced as an input to the closed chamber 12. As a result, the process provides a closed loop for the hydro fluoro ether used in the system. Since hydro fluoro ether is relatively expensive, it is desirable to minimize the loss of such hydro fluoro ether during the processing.

In FIG. 1, since the hydro fluoro ether has adsorbed the oxygen component of the air that is been introduced into the closed chamber 12, a nitrogen component will remain. This nitrogen component is discharged along line 28 at the top of the closed chamber 12.

The air and the hydro fluoro ether are circulated throughout the packed media in the closed vessel 12. In particular, this mixing is enhanced by the fact that air is input through line 14 adjacent to the bottom of the closed vessel 12 and then flows upwardly through the closed vessel 12. Reversely, the hydro fluoro ether is introduced into the closed chamber 12 adjacent to the top of the close chamber and then flows downwardly in the closed vessel 12 so that the air mixes with the hydro fluoro ether. The hydro fluoro ether can flow concurrently or counter-concurrently with the air.

It is important to note that within the concept of the present invention, the process 10 can be a process for generating or recovering a gas from an air feedstock. In particular, the air feedstock that is introduced along line 14 will be in contact with the hydro fluoro ether for a desired period of time so that the hydro fluoro ether absorbs a first gas component of the air feedstock so that an unadsorbed second gas component remains in the closed vessel. This unabsorbed second gas component can be collected from the closed vessel. With reference to FIG. 1, the first gas component is represented by oxygen and the second gas component is represented by nitrogen.

In experiments conducted with the present invention, the hydro fluoro ether flows at a rate of 5.3 gallons per minute and 40 kilograms per minute. The hydro fluoro ether contains no oxygen or nitrogen. The air inlet 14 passed 133.3 liters per minute of air. After processing, the gas outlet 28 passed 98.7 liters per minute of the nitrogen gas. This nitrogen gas included 5% oxygen and 95% nitrogen. As such, the gas passing along line 28 is nitrogen-rich gas. The adsorption tower will cause a residence time of contact between the air and the hydro fluoro ether of 30 minutes. The adsorption tower 12 has a volume of 600 liters, a diameter of 1.1 feet and a height of 22 feet. The outlet 18 from the closed vessel 12 passed had the hydro fluoro ether with 65% oxygen and 35% nitrogen. This outlet 18 passed the oxygen-adsorbed hydro fluoro ether at a rate of 46.25 grams per minute. The degassed output from the flash chamber 20 produced 62% of oxygen and 38% of nitrogen. As such, the output 28 of the flash chamber 26 is oxygen-rich. The oxygen was passed at 30.4 grams per minute and the nitrogen passed at 16.25 grams per minute. The hydro fluoro ether that passes from the flash chamber 20 along line 26 for recycling contained zero oxygen and zero nitrogen. The hydro fluoro ether flowed outwardly of the flash chamber 20 at a rate of 40 kilograms per minute. As such, tests involving the present invention showed that a nitrogen-rich gas was released from the closed vessel 12 and that an oxygen-rich gas was passed from the flash chamber 24.

It is important to note that, in the present invention, the steps of adsorbing, mixing and retaining are carried out in a closed vessel. The hydro fluoro ether is versatile, non-toxic, non-flammable and can be used in various critical industrial applications with excellent dielectric properties and a wide range of boiling points. These fluids have excellent materials compatibility and thermal stability. The hydro fluoro ether has a low global warming potential and ozone depletion potential. This gives the user an innovative and trusted solution that does not require compromise across performance, safety and sustainability.

The hydro fluoro ether fluid provides a balanced, cost-effective solution for gas separation. The hydro fluoro ether has no regulatory restrictions or phase outs, is non-chlorinated and is exempt from U.S. E.P.A. definitions for Volatile Organic Compounds, the hydro fluoro ether is nonflammable, nonconductive, non-corrosive, a low toxicity, and a high margin of worker safety. The hydro fluoro ether is a sustainable alternative to hydrochlorofluorocarbons, hydrofluorocarbons and other common industrial solvents.

Figure 2:
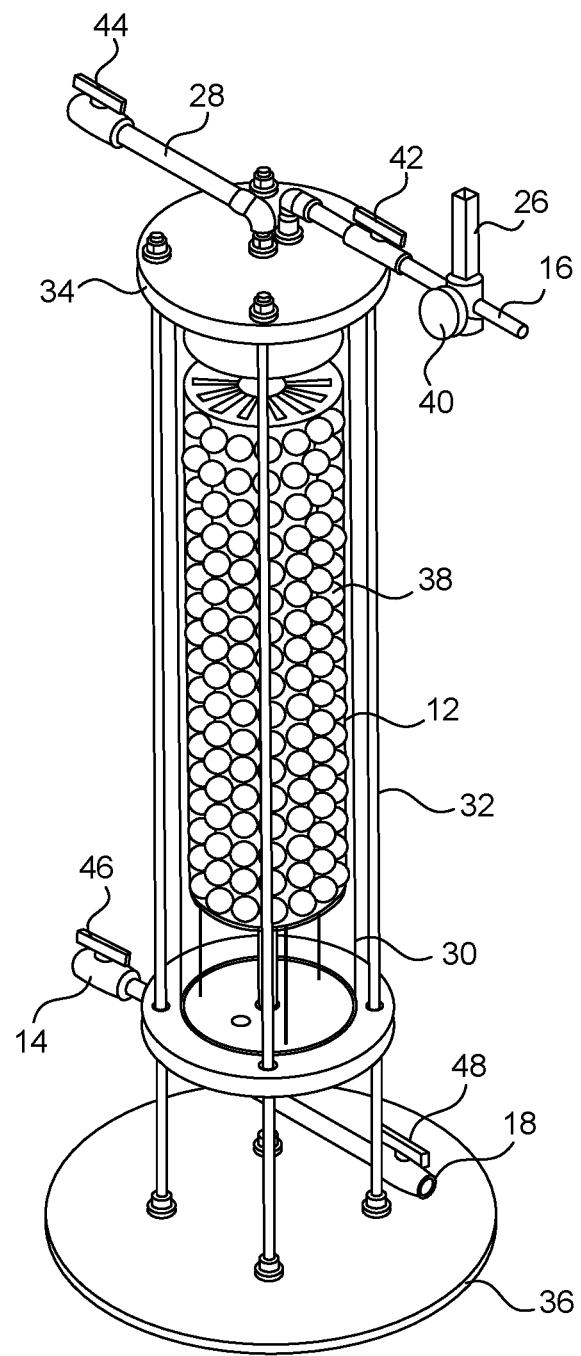
FIG. 2 is a perspective view of an transparent view of the tower as used for the separation of gases in the present invention.

FIG. 2 shows the closed vessel 12 in accordance with the present invention. It can be seen that the closed vessel 12 includes a tower 30 of a generally cylindrical nature. Supports 32 serve to maintain plate 34 and plate 36 in spaced parallel relationship to each other at the respective top and bottom of the tower 30.

The tower 30 is packed with a packing material 38. It can be seen that the packing material 38 includes a large number of inert spherical elements that are stacked upon each other within the interior of the tower 30. The use of the packing material 38 serves to increase the surface area contact between the hydro fluoro ether and the air within the interior of the tower 30.

The hydro fluoro ether can be introduced into the interior of the tower 30 through the line 16. It can be seen that the line 16 includes the return line 26 connected thereto. A suitable valve 40 can be incorporated on the lines 16 and 26 so as to control the rate of mixing of the returned hydro fluoro ether and the original hydro fluoro ether. Alternatively, line 26 can be connected to an original supply of hydro fluoro ether and line 16 could be connected as the return line. Another valve 42 controls the flow of the hydro fluoro ether into the interior of the tower 30.

The unabsorbed gas line 28 extends outwardly of the tower 30 adjacent to the plate 34. As such, line 28 will be suitable for delivery of nitrogen from the interior of the tower 30. A valve 44 is connected to the line 28 so as to control the rate of flow of the nitrogen from the interior of the tower 30. Air is introduced into the tower 30 through line 14. A valve 46 is connected the line 14 so as to control the rate of air flow into the interior of the tower 30. The mixture of oxygen and hydro fluoro ether is discharged from the tower 30 through line 18. A valve 48 is connected the line 18 so as to control the rate of the flow of the oxygen-adsorbed hydro fluoro ether through the line 18.

The process 10 of the present invention is used to separate some gas species from a mixture of gases under various pressures according to the species' molecular characteristics and solubilities in association with hydro fluoro ether materials. The present invention operates at near-ambient temperature, and operates in a significantly different manner from the prior art cryogenic distillation techniques of gas separation and the pressure swing adsorption processes. The hydro fluoro ether is used as a trap for the gas. The hydro fluoro ether preferentially adsorbs the target gas species based upon the solubility differences in the gases. The process 10 operates continuously.

The adsorption processes utilize the fact that under certain operating pressures, temperatures and gas concentrations, gases tend to be adsorbed into the liquid hydro fluoro ether based upon the specific solubilities of the individual gases in the mixture. When the pressure is reduced, the adsorbed gas is released or desorbed. This process 10 can be used to separate gases in a mixture because different gases tend to be dissolved in the hydro fluoro ether more or less strongly.

If the gas mixture is air, it is passed under pressure through the vessel containing the hydro fluoro ether so as to attract oxygen more strongly than nitrogen. A portion or all of the oxygen will be captured by the hydro fluoro ether and the remaining gas from the air that exits the vessel will be richer in nitrogen than the mixture entering the vessel. The adsorption vessel is designed such that the flows are countercurrent and that the hydro fluoro ether reaches the end of its capacity so as to adsorb oxygen at the discharge. The oxygen and the hydro fluoro ether can be regenerated by reducing the pressure so as to release the adsorbed oxygen from the hydro fluoro ether. Hydro fluoro ether is then ready for return to the adsorption tower for another cycle of adsorbing oxygen from the air.

The foregoing disclosure and description of the invention is illustrative and explanatory thereof. Various changes in the details of the described process can be made within the scope of the present claims without departing from the true spirit of the invention. The present invention should only be limited by the following claims and their legal equivalents.

I claim:

1. A process for separating oxygen from air, the process comprising:
    mixing air with hydro fluoro ether in a closed vessel for a desired period of time so that the oxygen from the air is adsorbed into the hydro fluoro ether;
    discharging the oxygen-adsorbed hydro fluoro ether from the closed vessel; and
    flashing the oxygen-adsorbed hydro fluoro ether into a chamber so as to separate the oxygen from the hydro fluoro ether.

2. The process of claim 1, further comprising:
    separating nitrogen from the air as the oxygen is adsorbed in the hydro fluoro ether within the closed vessel.

3. The process of claim 2, further comprising:
    discharging the nitrogen from the closed vessel.

4. The process of claim 1, the oxygen and the hydro fluoro ether being discharged at an elevated pressure, the step of flashing comprising:
    flashing the elevated-pressure oxygen-adsorbed hydro fluoro ether across a restricting orifice; and
    evaporating the oxygen from the flashed elevated-pressure oxygen-adsorbed hydro fluoro ether.

5. The process of claim 4, further comprising:
    discharging the evaporated oxygen from the chamber.

6. The process of claim 4, further comprising:
    collecting the hydro fluoro ether in the chamber following the step of flashing; and
    returning the collected hydro fluoro ether to a hydro fluoro ether inlet of the closed vessel.

7. The process of claim 1, the closed vessel being a tower having packed media therein, the step of mixing comprising:
    circulating the air and the hydro fluoro ether throughout the packed media in the tower.

8. The process of claim 1, the step of mixing comprising:
    inputting the air adjacent a bottom of the closed vessel;
    flowing the air upwardly through the closed vessel;
    inputting the hydro fluoro ether adjacent the top of the closed vessel; and
    flowing the hydro fluoro ether downwardly in the closed vessel such that the air mixes with the hydro fluoro ether.

9. The process of claim 1, the step of mixing comprising:
    flowing the hydro fluoro ether concurrently with the air.

10. The process of claim 1, the step of mixing comprising:
    flowing the hydro fluoro ether counter currently with the air.

* * * * *